United States Patent
Pietruszka

(10) Patent No.: US 7,366,672 B2
(45) Date of Patent: Apr. 29, 2008

(54) METHOD AND DEVICE FOR RECOVERING INTERRUPTED VOICE INPUT

(75) Inventor: Joerg Pietruszka, Bochum (DE)

(73) Assignee: Nokia Corporation, Espoo (FI)

( * ) Notice: Subject to any disclaimer, the term of this patent is extended or adjusted under 35 U.S.C. 154(b) by 510 days.

(21) Appl. No.: 11/129,654

(22) Filed: May 13, 2005

(65) Prior Publication Data

US 2006/0259305 A1 Nov. 16, 2006

(51) Int. Cl.
*G10L 11/00* (2006.01)
(52) U.S. Cl. ...................................... 704/275
(58) Field of Classification Search ................. 704/275
See application file for complete search history.

(56) References Cited

U.S. PATENT DOCUMENTS 5,848,373 A * 12/1998 DeLorme et al. ........... 701/200
2004/0021899 A1 * 2/2004 Jost et al. .................. 358/1.15
2004/0083107 A1 * 4/2004 Noda et al. ................. 704/270
2004/0176906 A1 * 9/2004 Matsubara et al. ......... 701/200

\* cited by examiner

*Primary Examiner*—David Hudspeth
*Assistant Examiner*—Josiah Hernandez
(74) *Attorney, Agent, or Firm*—Alfred A. Fressola; Ware, Fressola, Van Der Sluys & Adolphson LLP

(57) ABSTRACT

A method for recovering interrupted voice input, particularly voice input into communication, audio and/or navigation systems installed in a vehicle detects, during an ongoing voice input process, an event that requires interruption of the voice input process, stores an incomplete sequence of the voice input, and interrupts the voice input process in response to detection of the event. The method can further detect that the event has finished and can recover the voice input process based on the stored sequence. A corresponding device is also described.

16 Claims, 3 Drawing Sheets

METHOD AND DEVICE FOR RECOVERING INTERRUPTED VOICE INPUT

TECHNICAL FIELD

The present invention relates to a method and a device for recovering interrupted voice input, particularly voice input into communication, audio and/or navigation systems installed in a vehicle.

PRIOR ART

Voice control, i.e. control of certain devices by voice recognition input, has become increasingly popular. Particularly in situations/environments where a user can or should not use his hands for controlling certain devices such voice control is very advantageous. A natural application field for voice recognition input is thus vehicles, where a driver should always keep his hands on the wheel and his eyes on the road.

In many vehicle applications microphone and audio output (e.g. speaker, amplifier) are shared between voice recognition and other systems (e.g. phone or navigation system). This sharing can lead to interruptions of the voice recognition process by external events. A typical example for such an external event is an incoming phone call. An external event can require immediate user action, e.g. taking the call, such that the voice recognition process is interrupted. However this will result in the voice recognition sequence already input, i.e. an incomplete input sequence, being lost.

Other systems may simply suppress the external event until the voice input process is complete. This is even more undesirable, as an important call might be missed that way.

Therefore it is apparent that there is a need for a method and a system enabling users to take important calls or handle other external events requiring immediate action, while at the same time information that has already been input by voice recognition is preserved to be recovered.

According to an aspect of the invention a method for recovering interrupted voice input into a voice-controllable system of a vehicle is provided. The method comprises.
- detecting, during an ongoing voice input process, an event requiring an interruption of said voice input process;
- storing an incomplete sequence of said voice input; and
- interrupting said voice input process responsive to said detection of said event.

Storing a yet incomplete sequence being input by voice recognition enables to recover the input process without losing the already entered information as in conventional systems.

In an exemplary embodiment the method further comprises
- detecting that said event has been finished; and
- recovering said voice input process based on said stored sequence.

After the event requiring the interruption of the voice recognition input process is ended, e.g. after an incoming call has been answered, the invention enables to proceed with the interrupted voice input process by re-using the stored incomplete sequence. As the invention will usually be used in conjunction with input procedures requiring a plurality of individual inputs, like menu items or the like, "based on said stored sequence" will usually mean to restart the input process after the last individual input that was completed. Thus the last—incomplete—individual input will have to be repeated by the user. Every menu item or like that was already completed will be preserved and is not lost as in the state of the art.

In an exemplary embodiment said recovering step further comprises
- reproducing said stored sequence.

As will also be explained later a reproducing may mean to re-enter the already input information again in an automatic manner, by a sort of playback, enabling the user to proceed where the interruption occurred. This refers to systems, e.g. navigation systems or like, that are not fully integrated, i.e. do not provide a capability for itself to deal with the interruption. But even with more sophisticated systems it may be advantageous to replay the incomplete input sequence as a reminder for the user about the information already input. Reproducing is to be understood both as audible playback as well as displaying the already input information on a display device.

In an exemplary embodiment said storing step is performed responsive to said detection of said event. Storing is thus only required in case any event requiring an interruption actually occurs.

In an exemplary embodiment said input process comprises a plurality of individual inputs to be performed, and said storing step is performed subsequent each completed individual input. This kind of "incremental" storing requires that the storage is used more frequently than in the previously described embodiment; however in this manner it is possible to store only the newly entered information each time, instead of the whole incomplete input sequence, which is apparently advantageous.

In an exemplary embodiment interrupting said voice input process is delayed until said storing step subsequent a completed individual input is completed. This is mainly useful in connection with the embodiment just described above. In case only a small amount of information has to be inputted to complete an individual input—menu item or like—, i.e. only a few moments are necessary, the user is herewith enabled to complete this step of the input process before taking an incoming call or handling a similar event requiring an interruption of the input process.

In an exemplary embodiment the method further comprises
- detecting that said event has been finished;
- providing the user a selection comprising at least an option to abort said voice input process and an option to recover said voice input process; and
- recovering said voice input process based on said stored sequence responsive to the user selecting said resume option; or
- discarding said stored sequence responsive to the user selecting said abort option.

In case the external event has caused a change in the user's situation it is advantageous to offer him to abort or continue. For example a meeting he was about to drive to may have been cancelled or the destination address may have changed. In such cases it is likely the user will not want to resume the interrupted input process, but start anew. With this embodiment he is enabled to do so immediately after finishing handling the event.

In an exemplary embodiment said voice input process comprises a plurality of individual inputs to be performed, and wherein said recovering step further comprises
- determining which inputs are already completed within said stored sequence; and
- resuming said voice input process subsequent to the last completed individual input.

With an input process structured like this, e.g. like a hierarchical input menu, it is advantageous to restart after the last completed input and discard all other input information as this will be useless.

In an exemplary embodiment said system provides telecommunication functionality, and wherein said event requiring an interruption is an incoming call.

In an exemplary embodiment said system provides traffic announcement functionality, and wherein said event requiring an interruption is an incoming traffic announcement.

According to another aspect of the invention a system for integration in a vehicle for recovering interrupted voice input is provided. The system comprises at least one voice-controllable component;
a voice input device;
a storage device adapted for storing voice input sequences;
a controller connected with said at least one voice-controllable component, said voice input device and said storage device;

wherein said controller is adapted for
detecting, during an ongoing voice input process, an event requiring an interruption of said voice input process;
storing an incomplete sequence of said voice input process in said storage device;
interrupting said voice input process responsive to a detection of said event; and
recovering said voice input process based on said stored sequence.

Such a device enables to perform the method of the invention described above. Voice-controllable components may for example be navigation systems, hands free kits or also an FM radio receiver, CD changer or other audio system. Within the scope of the invention are is any other component in a vehicle, like windows lifters etc., that can be controlled using a voice recognition input.

In an exemplary embodiment the system further comprises at least one output device connected with said controller;

and wherein said controller is further adapted for:
reproducing said stored incomplete sequence with said output device.

Advantages of this have already been discussed above. The output device can be any kind of audio output or visual output device, like loudspeakers or displays.

In an exemplary embodiment the system further comprises a selection component connected with said controller, adapted for enabling the user to select at least one of an option to abort said input process and an option to resume said voice input process;

and wherein said controller is further adapted for
initiating said recovering of said voice input process responsive to the user selecting the resume option; or
deleting said stored sequence responsive to the user selecting the abort option.

The selection component will have to provide two functions. First presenting the user with the selection options, and second enabling him to enter his choice. This can be implemented using any suitable means, like display plus input buttons, or using voice output and recognition, i.e. loudspeaker and microphone.

In an exemplary embodiment said voice input process comprises a plurality of inputs to be performed, and wherein said controller is further adapted for determining which inputs are already completed within said stored incomplete sequence; and
resuming said voice input process subsequent to the last completed individual input.

In an exemplary embodiment the system further comprises a component providing telecommunication functionality, and wherein said event is an incoming call.

In an exemplary embodiment the system further comprising a component providing traffic announcement reception functionality, and wherein said event is an incoming traffic announcement. The component can e.g. be an FM radio receiver, but also a wireless internet or paging terminal or like.

SHORT DESCRIPTION OF THE DRAWINGS

The invention will be illustrated in more detail in the following description of preferred embodiments, with reference to the attached drawings which are solely provided as illustrative but non-limiting examples, and wherein.

DETAILED DESCRIPTION OF THE INVENTION

The invention deals with voice/speech recognition in a car/vehicle environment. The usage of voice recognition in car environments is continuously increasing and therefore solutions are needed to improve the usability of voice recognition processing and handling for car systems. In principle voice recognition can be used for controlling all kinds of car systems, but usually this functionality is mainly used for controlling the car audio and communication system as well as navigation system. The user can e.g. select radio channels/audio tracks, enter destination information into a car navigation system or control the functionalities of the car phone/car hands free phone equipment by voice.

Usually the voice recognition system will be using the same acoustical channels/devices as the car communication system. For example the car audio loudspeakers are used as the output for the car radio, as well as for the car phone/hands free equipment. The car loudspeakers can as well be used for the car navigation system for outputting route guidance information. Further the same microphone is used for entering destination addresses to the car navigation system as well as an input device for the car phone for speech communication over a cellular phone network.

But even when these devices are not using the same acoustical input and output channels the systems are co-operating quite often in that sense that e.g. the car radio is muted when an incoming phone call is accepted.

Entering information by voice can be a lengthy procedure, e.g. entering a destination address (town, street, house number and maybe wanted type of route (fastest/shortest route) etc.) into the navigation system, or storing a new entry in the phonebook storage of a mobile phone connected with the cars hands free device. In the conventional systems in use today it can happen quite easily that a user enters a destination address to a car navigation system or a name tag into the car phones phonebook memory and that this input sequence or input process is interrupted by an incoming voice call.

Conventionally such kind of interruption results in the loss of the data that was inputted until the interruption occurs. The user will then need to enter the complete destination address or name and phone number again after the phone call is terminated, i.e. the complete input sequence will be lost even if there were certain menu items which were already completely set.

The invention therefore proposes to store each detail of e.g. an input into a car navigation system once the detail is completely entered and before e.g. the destination address input dialog is interrupted by another event (incoming phone call). Or the address details entered so far are transferred to a more permanent storage and the interrupt is not executed before storage of the entries done so far is confirmed by the system.

Figure 1:
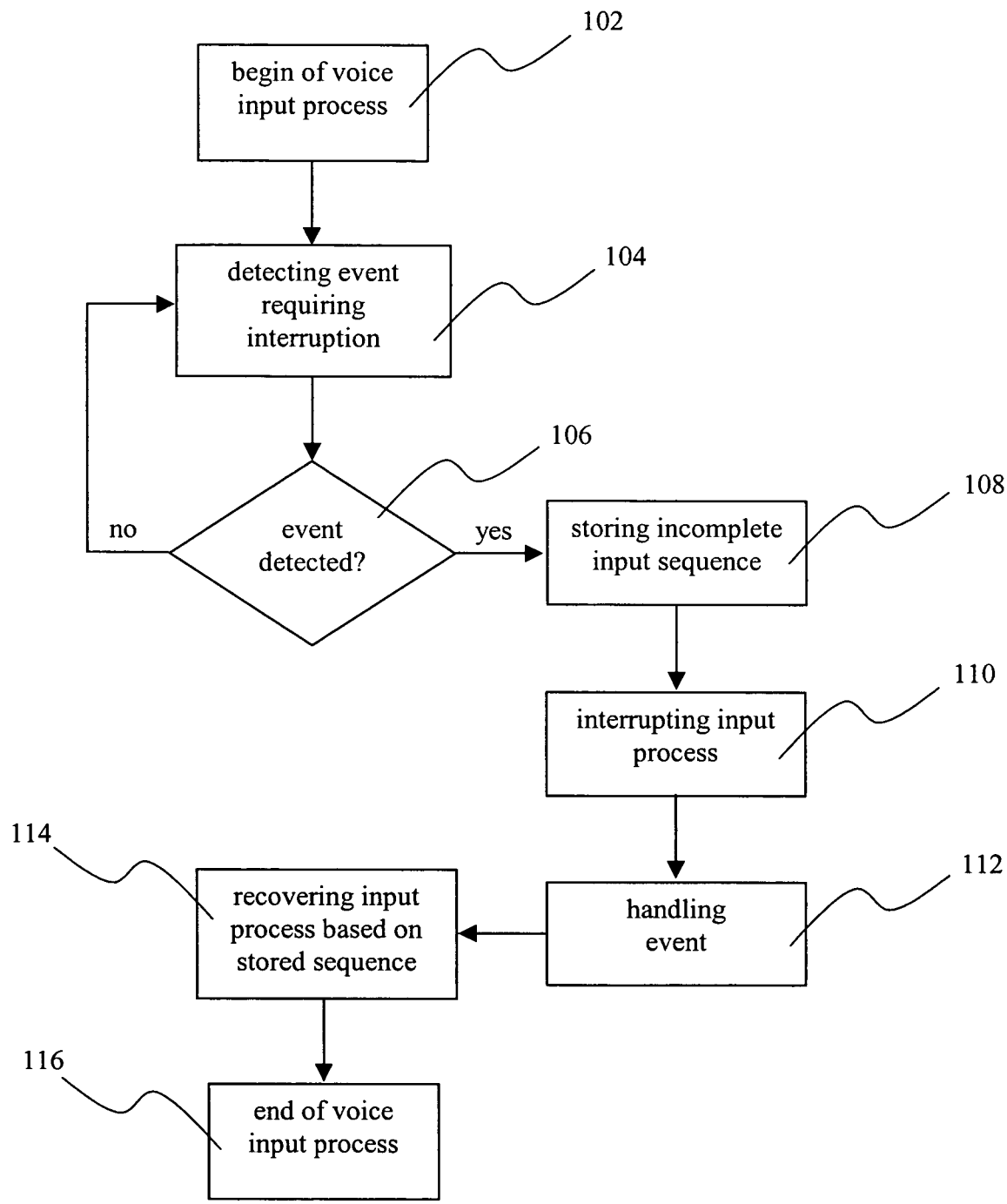
FIG. 1 is a flow diagram of an embodiment of the method according to the invention.

FIG. 1 shows the basic steps of an embodiment of the method according to the invention. In step 102 an input using voice recognition begins. This may for example be the input process required to use the integrated navigation system in a car, i.e. entering destination data, additional route date/user preferences and the like. In step 104 a detection of an event is performed which requires interrupting the voice input process, e.g. an incoming call or other events calling for immediate user interaction. If such an event is detected in step 106 the method continues with step 108, otherwise the detection is repeated. The yet incomplete input sequence is stored in step 108.

It should be noted that it is within the context of this invention to perform this storing in different suitable ways. One very simple solution would be using a voice memory, i.e. storing the "raw" voice input data. In conjunction with certain navigation systems or other voice controlled systems this enables to replay the stored voice input sequence later on, even without a data connection with that system. Another more sophisticated solution will store the incomplete input sequence in connection with a voice controlled component, e.g. within that component itself. This will usually mean storing not the raw voice data but the already processed data. A simple yet advantageous way is to store those input items that are already completed. This particularly concerns a conjunction with a voice input process requiring inputting a plurality of settings to complete an input process, like menu items or the like. The last not yet completed menu item can then be used as a starting point when recovering the voice input sequence.

In step 110 the ongoing input process is interrupted in order to enable handling the event. In other words the voice input process is put in a kind of "waiting state" while the event is handled (in step 112), for example during a call that is being answered. In step 114 the voice input process is recovered or resumed, based on the stored sequence. As already pointed out above there are different ways of performing this step, simply replaying the stored sequence and then continuing, or resuming the input process with the last item that was not completely inputted. The user can now end the input process, step 116. It should be noted that the input process can of course also be ended normally in case there is no event detected during the process (this case is not shown in the figure).

Figure 2:
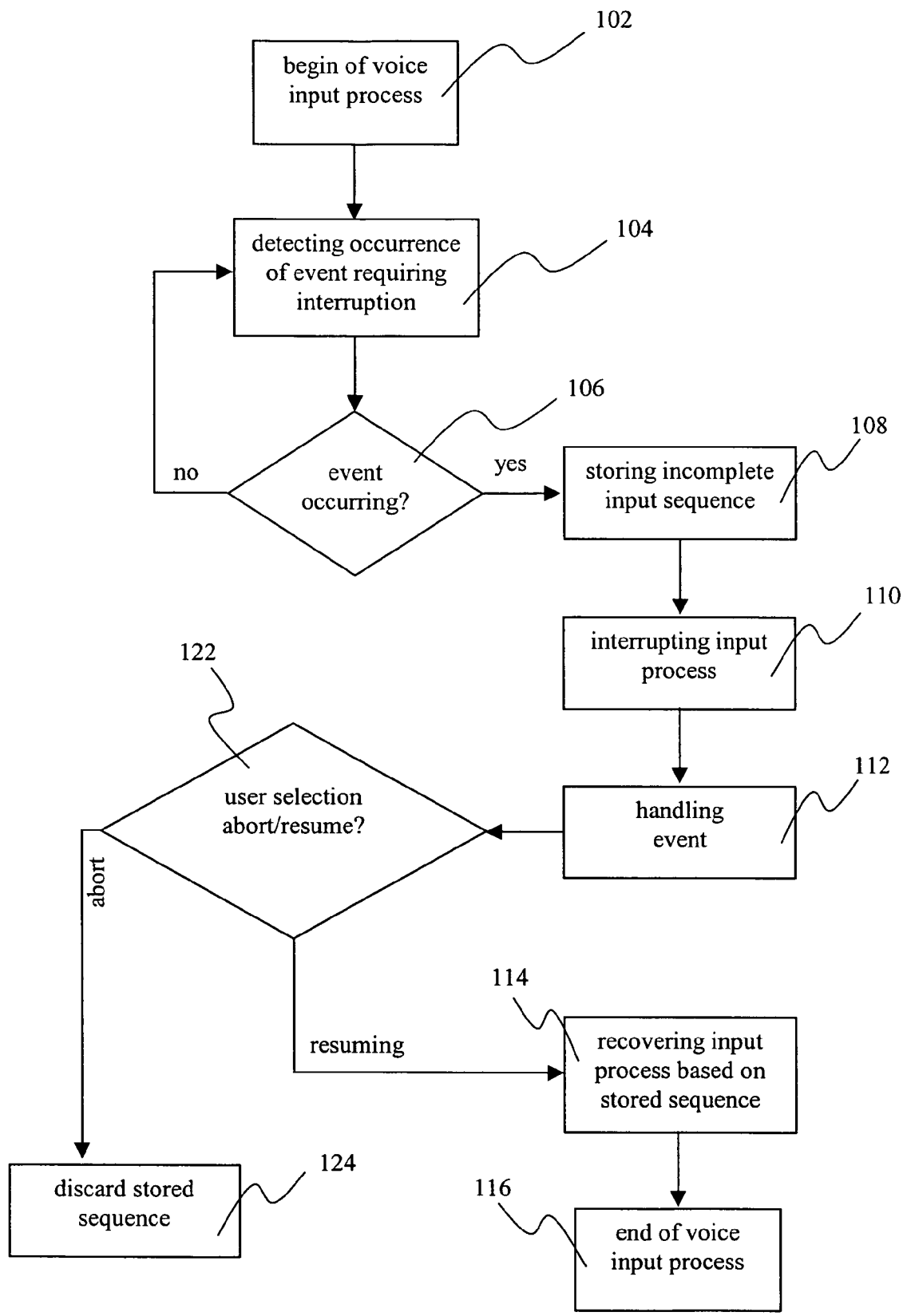
FIG. 2 is a flow diagram of an advanced embodiment of the method according to the invention.

FIG. 2 shows additional steps of an advanced embodiment of the inventive method. Steps similar to those depicted in FIG. 1 have been given the same reference numerals, so for a detailed description of those steps please refer to the description of FIG. 1. After handling of the event in step 112 is completed the method of this embodiment continues with step 122, in which the user is presented a selection between at least an abort and a resume option. The abort option can be useful if conditions related to the interrupted voice input process have changed, like e.g. a friend called in order to cancel a meeting. In such a case a not yet completed input into the navigation system might not be necessary anymore, so the user is offered to cancel or abort here. If he does so the stored sequence, which is not necessary anymore, will be discarded in step 124. The user can for example start a new input process, in case his destination has changed, or even decided to leave his car and stay home or the like (not shown). If the user selects the resume option in step 122 the method continues with step 114 similar to FIG. 1.

Figure 3:
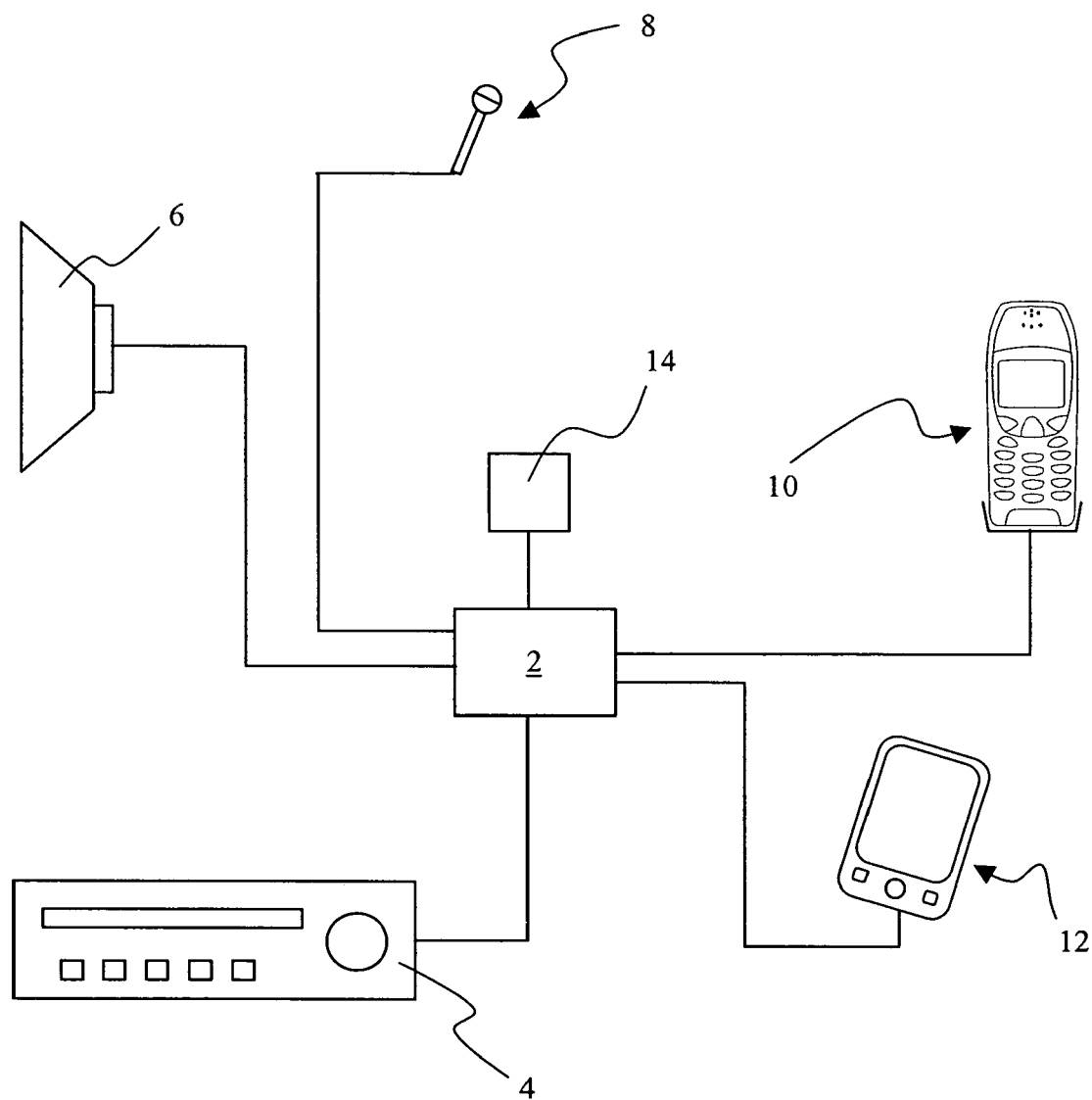
FIG. 3 schematically shows components of the system according to the invention.

FIG. 3 shows components of a system according to the invention. Shown here are three components that may be controlled by voice input. A mobile phone 10 is to be understood as illustrative for any component providing telecommunication functionality, i.e. a mobile phone in a car integration cradle, connected wired or wireless, as well as other conceivable telecommunication configurations. Voice control can be used here in order to perform dialing, inputting new entries into a phonebook or like actions. A PDA 12 represents navigation functionality, which can be kind of "external" like suggested by the PDA 12. However the component 12 symbolically shown here as PDA may also be a navigation system integrated into a car. Another component or subsystem that may be controlled using voice command is a car audio system 4, wherein e.g. changing the radio channel or the CD track can be performed with voice input.

The three components 10, 12 and 4 are connected to a main controller 2 of the system. The controller 2 is further connected with an output device 6 (symbolically depicted by a loudspeaker here), a voice input device 8 and a memory device 14. The memory device 14 is adapted to store voice input sequences, in different suitable forms as described in conjunction with FIG. 1. The voice input device 8 serves as the input device for user voice input, and may for example be the microphone also used for hands free functionality of a telecommunication component. It should be noted that the loudspeaker 6 is only representative for output devices both audible and visual. The output device 6 can also be (or comprise) a display. It should be noted that the output device 6 is optional in some embodiments of the invention; it can be used for playing back the stored incomplete sequence after an interruption occurred. For example a display can be used to repeat all steps, also those that were already completely inputted before the interruption, in order to assist the user in completing the input procedure.

As the user might not exactly remember where he was interrupted this is a nice feature improving comfort and usability of the system according to the invention. Similarly an audio output device can be used for playback of "raw" voice input. Additional to the "reminder" function of such playback it may also be utilized in conjunction with not so well integrated navigation systems or like, i.e. when the respective component does not allow a proper resuming itself. In such cases it is possible to simply replay the interrupted input sequence and let the voice recognition be started anew. Thus this may offer the possibility to even enhance already installed navigation or other voice controllable systems with the present invention.

However the most preferred solution is of course a decent level of integration/cooperation between components within a system according to the invention. In this manner the voice controlled component can be properly put into a "wait state" during an interruption and later resume the input process where it was left, i.e. with the last menu item or such that was not yet inputted completely.

When a user uses the voice recognition system in his car for making selections (e.g. entering destination into a car navigation system) the information already entered is lost by an interruption (e.g. an incoming phone call). The user needs to start the process from the beginning after the interrupt.

The present invention provides a solution to these problems. After each partial entry (or before an incoming interrupt) during voice recognition the already entered information is stored. After the interrupt is processed (e.g. incoming voice call has been answered) the voice recognition system restores the already entered information and the user can proceed with the already started voice recognition entry.

It will readily be appreciated that it is annoying and very uncomfortable for a user to be forced to repeat a possibly lengthy input sequence after finishing the call in question. As an example it may be assumed that a user has started to perform an input sequence into his navigation system. He will have entered destination town, address, a couple of intermediate route points and some additional information when the cars hands free device signals an incoming call.

Having almost completed the navigation system input sequence the user may only have to input some final data like preferred route (fastest, shortest) to end the input sequence. However in the time this will require the caller may already have hung up again. Also the incoming call indication will be rather annoying when finishing the input at the same time. In case the incoming call is signaled using a ring tone this will disturb the voice recognition anyway, so that a continuation is impossible at this point.

Therefore it is apparent that most users in this or a similar situation will always prefer to take the call even if this means discarding the data already input. After the call is ended the input sequence has thus to be repeated, requiring time and attention from the user. Conventional systems of the prior art will require a user to perform this annoying actions when external events cause a termination of the voice recognition procedure.

For example a friend could call in order to inform the user that the destination address of the trip he was just preparing has changed (meeting some other place or the like). In such a case the user might also be forced to repeat the (this time complete) input sequence, depending on the capabilities of the navigation system.

Speaker independent voice recognition is becoming more and more mature and is deployed in an increasing number of products. However not every utterance is understood by the voice recognition routine. Because of misunderstandings or false inputs that may thus happen it still takes a decent amount of time for a user to input a command or even a large command sequence by voice recognition.

The present invention adds a kind of "waiting state" to voice recognition. The waiting state can be entered at any time and entering it is triggered by the occurrence of an external event requiring an interruption of the voice input process. While the waiting state is performed the external event can be handled, e.g. a call can be answered. After the external event is ended the voice recognition process can be recovered or resumed, respectively, according to this invention.

What is claimed is:

1. A method for recovering interrupted voice input into a voice-controllable system of a vehicle, the method comprising:
    detecting, during an ongoing voice input process, an event requiring an interruption of said voice input process;
    storing an incomplete sequence of said voice input; and
    interrupting said voice input process responsive to said detection of said event.

2. The method according to claim 1, further comprising:
    detecting that said event has been finished; and
    recovering said voice input process based on said stored sequence.

3. The method according to claim 2, wherein said recovering step further comprises:
    reproducing said stored sequence.

4. The method according to claim 1, wherein said storing step is performed responsive to said detection of said event.

5. The method according to claim 1, wherein
    said input process comprises a plurality of individual inputs to be performed; and
    said storing step is performed subsequent each completed individual input.

6. The method according to claim 5, wherein interrupting said voice input process is delayed until said storing step subsequent to a completed individual input is completed.

7. The method according to claim 1, further comprising:
    detecting that said event has been finished;
    providing the user a selection comprising at least an option to abort said voice input process and an option to recover said voice input process; and
    recovering said voice input process based on said stored sequence responsive to the user selecting said resume option; or
    discarding said stored sequence responsive to the user selecting said abort option.

8. The method according to claim 1, wherein said voice input process comprises a plurality of individual inputs to be performed, and wherein said recovering step further comprises:
    determining which inputs are already completed within said stored sequence; and
    resuming said voice input process subsequent to the last completed individual input.

9. The method according to 1, wherein said system provides telecommunication functionality, and wherein said event requiring an interruption is an incoming call.

10. The method according to 1, wherein said system provides traffic announcement functionality, and wherein said event requiring an interruption is an incoming traffic announcement.

11. A system for integration in a vehicle for recovering interrupted voice input, comprising:
    at least one voice-controllable component;
    a voice input device;
    a storage device adapted for storing voice input sequences;
    a controller connected with said at least one voice-controllable component, said voice input device and said storage device;
    wherein said controller is adapted for
    detecting, during an ongoing voice input process, an event requiring an interruption of said voice input process;
    storing an incomplete sequence of said voice input process in said storage device;
    interrupting said voice input process responsive to a detection of said event; and
    recovering said voice input process based on said stored sequence.

12. The system according to according to claim 11, further comprising at least one output device connected with said controller;
    and wherein said controller is further adapted for:

reproducing said stored incomplete sequence with said output device.

13. The system according to claim 11, further comprising:
a selection component connected with said controller, adapted for enabling the user to select at least one of an option to abort said input process and an option to resume said voice input process;
and wherein said controller is further adapted for
initiating said recovering of said voice input process responsive to the user selecting the resume option; or
deleting said stored sequence responsive to the user selecting the abort option.

14. The system according to claim 11, wherein said voice input process comprises a plurality of inputs to be performed, and wherein said controller is further adapted for
determining which inputs are already completed within said stored incomplete sequence; and
resuming said voice input process subsequent to the last completed individual input.

15. The system according to claim 11, further comprising a component providing telecommunication functionality, and wherein said event is an incoming call.

16. The system according to claim 11, further comprising a component providing traffic announcement reception functionality, and wherein said event is an incoming traffic announcement.

* * * * *

UNITED STATES PATENT AND TRADEMARK OFFICE
CERTIFICATE OF CORRECTION

PATENT NO. : 7,366,672 B2  Page 1 of 1
APPLICATION NO. : 11/129654
DATED : April 29, 2008
INVENTOR(S) : Pietruszka It is certified that error appears in the above-identified patent and that said Letters Patent is hereby corrected as shown below:

At column 8, line 39, claim 9, line 1, please insert the word --claim-- before the number "1".

At column 8, line 43, claim 10, line 1, please insert the word --claim-- before the number "1".

At column 8, line 64, claim 12, line 1, please delete the second occurrence of the phrase "according to".

Signed and Sealed this

Nineteenth Day of August, 2008

JON W. DUDAS
*Director of the United States Patent and Trademark Office*